W. F. BAIRD.
Churn.
No. 207,935. Patented Sept. 10, 1878.
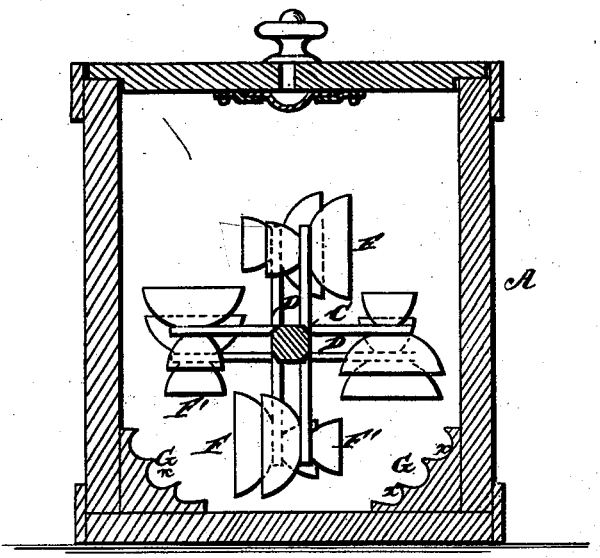
Fig. 1.
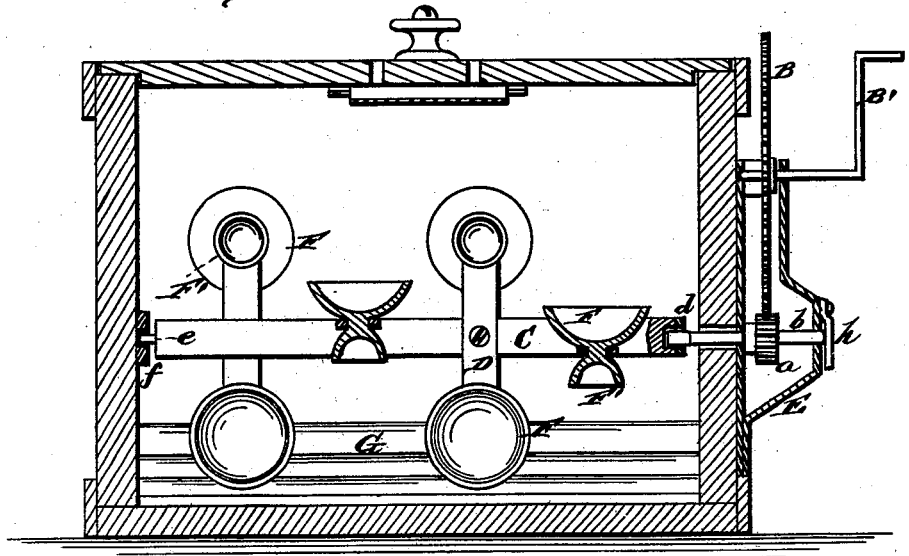
Fig. 2.
Fig. 3.
WITNESSES
INVENTOR,
Wm F. Baird.
Gilmore, Smith & Co.
ATTORNEYS.

UNITED STATES PATENT OFFICE.

WILLIAM F. BAIRD, OF BURLINGTON, IOWA.

IMPROVEMENT IN CHURNS.

Specification forming part of Letters Patent No. 207,935, dated September 10, 1878; application filed May 25, 1878.

*To all whom it may concern:*

Be it known that I, WILLIAM F. BAIRD, of Burlington, in the county of Des Moines and State of Iowa, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse vertical section of my churn, and Fig. 2 is a longitudinal vertical section of the same. Figs. 3 are detail views thereof.

The nature of my invention relates to the construction and arrangement of a churn-dasher and cream-breaker, as will be hereinafter more fully set forth.

The annexed drawing, to which reference is made, fully illustrates my invention.

A represents a rectangular box of any suitable dimensions, provided at one end, on the outside, with a gear-wheel, B, having a crank, B', for rotating the same. This wheel meshes with a pinion, $a$, upon a shaft, $b$, which, with the shaft of the wheel B, has its bearing in a metal frame, E, secured on the outside of the box A. One end of the shaft $b$ projects into the box, and is made flat or square, and enters a corresponding hole in a plate, $d$, secured on the end of a shaft or roller, C, the other end whereof has a pivot, $e$, which enters a bearing, $f$, in the opposite end of the box A. By slipping the shaft $b$ outward, the roller or shaft C, with the dashers attached to it, can be removed from the box. When the dashers are in place, and the shaft $b$ moved inward to have the pinion $a$ in gear with the wheel B, said shaft $b$ is held in place by means of a latch, $h$, on the frame E. The shaft or roller C is provided with a series of arms, D, in each end of each of which is secured a dasher, consisting of a large cup, F, and a small cup, F', arranged with their base or convex surfaces toward each other. The dashers are arranged so that the small cup will enter the cream first, and be followed by the large one in each case. The large cups, F, have their mouths upward, thereby forming a vacuum, and as they descend into the cream they draw the air after them. The bowls of these cups being downward renders it easy to operate, and when they are brought in contact with the cream they throw it horizontally in every direction, cream against cream, and cream against the sides and ends of the box. On leaving the churn on their upward course they draw the cream after them, thus producing a strong commotion in the cream. The small cups, F', having their mouths downward, drive the air into the cream and force the cream against the bottom of the churn and against cream-breaks G G in the corners of the churn, and also against the sides and top of the churn.

The dasher-arms D are so arranged on the shaft C that no two cups come in contact with the cream at the same time, but rapidly follow each other in a spiral line alternately from one end of the churn to the other. The small cups drive the air into the cream while the large cups draw the air into it. The small cups force the cream before them and the large cups draw the cream after them. Thus combined they produce a great and thorough agitation of the cream.

The cream-breaks G are placed at the bottom along the sides of the box A, and their inner faces are fluted or corrugated, as shown at $x$ $x$, which checks the motion of the cream, preventing it from easily gliding over the breaks, and gives greater power to the dash, and also keeps the cream at the bottom of the churn in such position as to be more thoroughly operated by the force of the dash.

What I claim as new, and desire to secure by Letters Patent, is—

1. The churn-dasher described, consisting of the series of double cups, with mouths in opposite directions, secured by radial arms to a horizontal revolving shaft, adapted to enter the cream with one mouth down and one mouth up, as specified.

2. In a churn-dasher, the combination of two series of cups attached to arms upon a horizontal rotating shaft, and arranged so that one series of cups enter the cream with their mouths down and the other up, for the purposes set forth.

3. The combination, with the horizontally-rotating shaft C, of the arms D, arranged spirally thereon, and the double cups F F′, all substantially as and for the purposes set forth.

4. The combination, with the operating cog-wheel B, of the frame E, shaft $b$, with pinion $a$ and latch $h$, substantially as and for the purposes set forth.

In testimony that I claim the above I have hereunto subscribed my name in the presence of two witnesses.

WILLIAM F. BAIRD.

Witnesses:
 W. H. BAIRD,
 D. C. RIDDING.